Dec. 20, 1966  W. H. JENKINS  3,293,017
METHOD FOR FORMING GLASS WAFERS
Filed March 20, 1963  2 Sheets-Sheet 1

INVENTOR.
WESTON H. JENKINS
BY Clarence R. Patty, Jr.
ATTORNEY

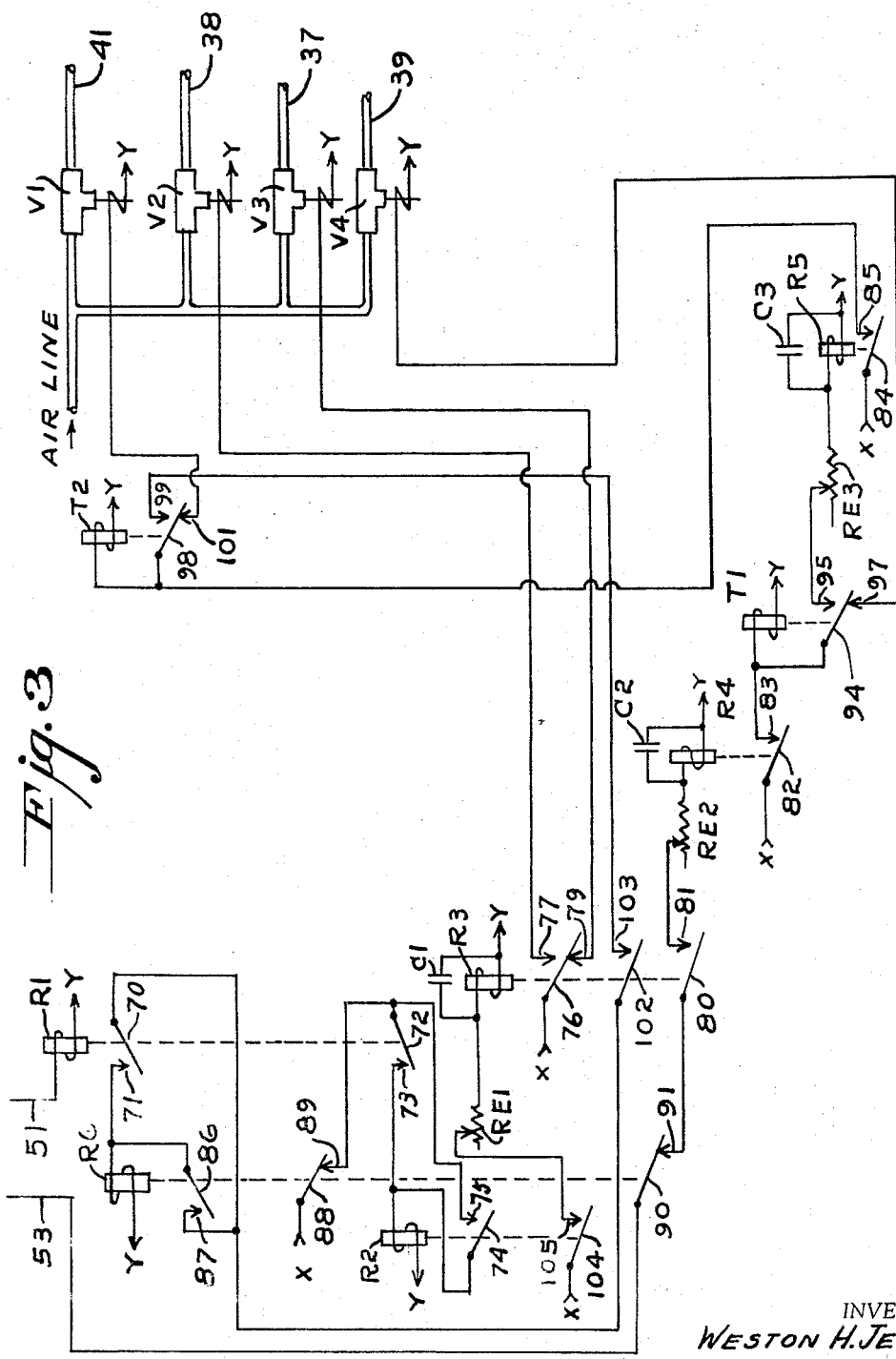

United States Patent Office 3,293,017
Patented Dec. 20, 1966

3,293,017
METHOD FOR FORMING GLASS WAFERS
Weston H. Jenkins, Corning, N.Y., assignor to Corning Glass Works, Corning, N.Y., a corporation of New York
Filed Mar. 20, 1963, Ser. No. 266,649
6 Claims. (Cl. 65—72)

This invention relates to the manufacture or forming of small, thin and relatively uniform glass wafers or disks. More particularly, this invention is directed to a method of forming such wafers or disks, and an apparatus and control system for practicing the method disclosed.

As is well known in the glass-making art, the comparative properties of two or more pieces of glass formed from the same glass-making composition depend upon their thermal histories, that is, upon their fictive temperatures which, for each such piece of glass, is in turn dependent upon the rate at which the respective piece of glass is cooled over a transformation range of temperatures below the liquidus temperature of the molten glass from which the piece of glass is formed. The liquidus temperature of molten glass has been defined as the maximum temperature at which equilibrium exists between the molten glass and its primary crystalline phase. Since most glasses cannot be readily worked at viscosities much about $10^4$ poises, and since most glasses at their liquidus temperatures are relatively viscous liquids, the working temperatures of glasses are ordinarily many degrees above their liquidus temperatures. However, most glasses are still sufficiently viscous at their working temperatures that they can be readily handled and formed.

In relatively recent months, for the purpose of manufacturing semicrystalline ceramic, barrier layer capacitors, new glass-making compositions have been developed. For example, in the co-pending application of Paul E. Gordon, Andrew Herczog and Edward L. Luke, Serial No. 262,877 filed March 5, 1963, which application is assigned to the assignee of the present application, there is disclosed a method of making semicrystalline ceramic, barrier layer capacitors from a glass-forming batch consisting essentially, by weight, of 5–15% $SiO_2$, 5–15% $Al_2O_3$, the ratio $SiO_2:Al_2O_3$ being equal to 3⅓, and 70–90% $BaO+TiO_2$, the ratio $BaO:TiO_2$ being equal to 0.90–1.2 on a molar basis, the total of said $SiO_2$, $Al_2O_3$, $BaO$ and $TiO_2$ comprising at least about 90% of said glass-forming batch.

It has been found that the viscosities of the batches of molten glasses made from the compositions developed for the purpose of manufacturing barrier layer capacitors are extremely low ($\sim$1 poise) even when the temperatures of the molten glasses approach their liquidus temperatures which are in the range of 1250° to 1400° C. It is believed readily apparent that the handling and forming of glasses having such low viscosities is extremely difficult.

When a glass-making composition such as that discussed is used for forming a series of reltaively small and thin wafers or disks for use in manufacturing barrier layer capacitors, since it is requisite in the manufacture of such capacitors that each wafer have properties uniform with the other wafers of the series, it is necessary for each wafer to have substantially the same thermal history as the other wafers of the series. In attempting to form such a series of wafers or disks, such as, for example, on the order of ⅜" to ¾" diameter with a thickness of 0.010" to 0.030", it has been found that glasses made from said glass-making compositions have a strong tendency toward rapid devitrification when cooled below their liquidus temperatures and, therefore, such glasses must be cooled at an extremely rapid rate to assure similarity in the properties of each piece of glass or wafer since, by such cooling, the thermal history of each such wafer will be substantially identical to the thermal history of each other wafer formed from the same or similar glass-making composition.

It is, therefore, an object of the present invention to provide an apparatus, and control system for such apparatus, for forming relatively small and thin disks from a molten glass-making composition having an extremely low viscosity at its working temperature.

It is another object of the invention to provide an apparatus, and control system therefor, by which may be formed relatively uniform glass wafers from a molten glass-forming composition having an extremely low viscosity at or near its liquidus temperature and a strong tendency toward rapid devitrification during cooling.

Another object of the present invention is to provide a new and novel method of charging a mold with a gob of a molten glass-forming composition.

It is a fourth object of the invention to provide a method of and apparatus for forming and then rapidly cooling each of a series of glass wafers or disks from the liquidus temperature of the glass-making composition from which the wafers are formed to a fictive temperature, such fictive temperature being substantially the same for each such wafer.

It is a fifth object of the present invention to provide a method for imparting a substantially identical thermal history to each of a series of glass wafers formed from the same batch or similar batches of a molten glass-forming composition.

Other objects and characteristic features of the invention will become apparent as the description proceeds.

In accomplishing the above objects of the present invention, there is provided apparatus for issuing from an orifice molten glass-making material in freely forming and falling drips, a mold movable between first and second positions for catching, and pressing and rapidly cooling, respectively, individual ones of said drips, and a control system for synchronizing such movement of the mold with the drip rate of the molten material so that, during each cycle of operation of the mold between said positions, the mold catches and presses only a single one of said drips and is returned to its drip catching position without colliding with any of the subsequently falling drips.

The invention will now be described in detail in connection with the accompanying drawings, of which:

FIG. 3 is a schematic wiring diagram of relays, timing devices and magnetic valves employed in the control system associated with the apparatus shown in FIGS. 1 and 2.

Similar reference characters refer to similar parts in each of the drawings.

Figure 1:
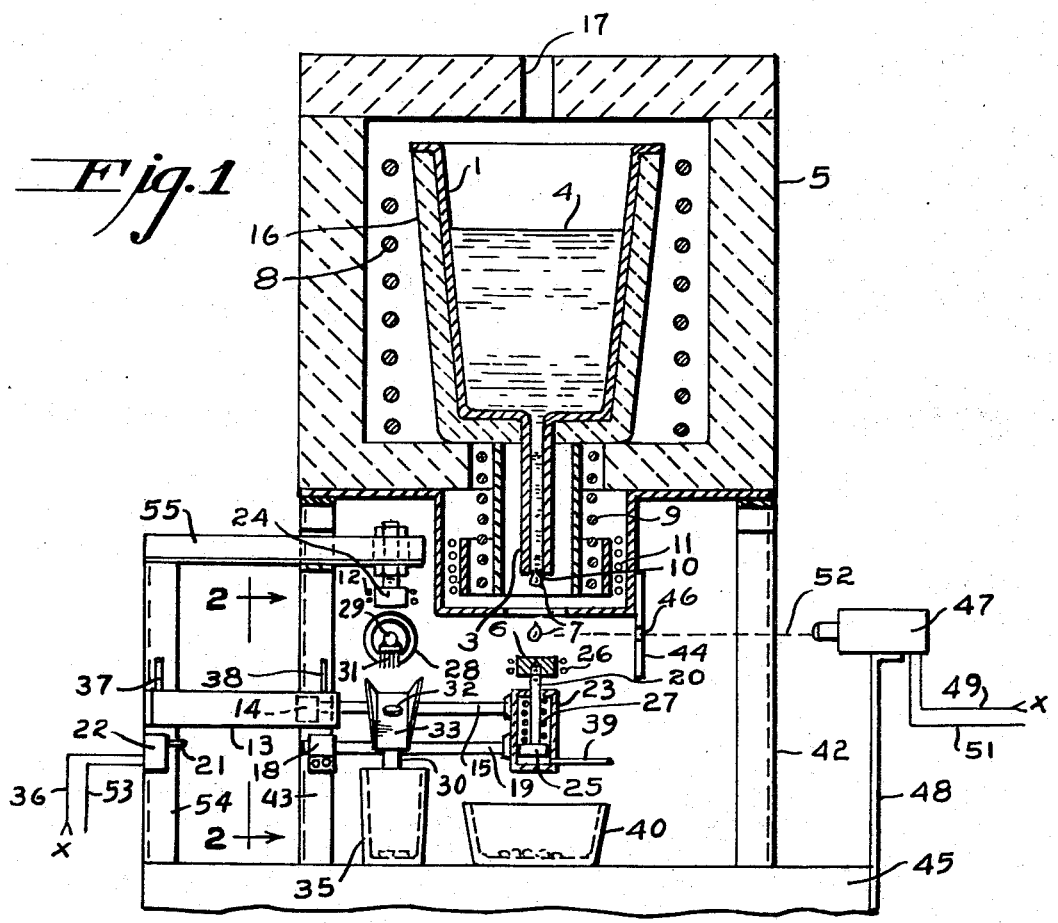
FIG. 1 is a front elevational view of the apparatus, partly in section, and illustrates a batch of molten glass-making material and the method of charging a mold with a gob of the material.

Referring to FIG. 1, there is shown a crucible 1 provided with a backer 16 and enclosed in a furnace 5. The furnace is provided with a heater winding 8 and an aperture 17 through which glass-making ingredients are supplied to crucible 1. A portion of the bottom of crucible 1 has been extended downwardly to form a delivery tube 3 provided with an orifice 10 from which a molten glass-forming batch 4 contained in crucible 1 issues in freely forming and falling drips 7. As previously discussed, the molten glass-forming batch 4 has an extremely low viscosity even at its liquidus temperature and the diameter of delivery tube 3 and its orifice 10 are so selected in accordance with such viscosity that the batch issues from the orifice in the manner stated. Additional heater windings 9 and 11 are provided to maintain the temperature of the delivery tube and its tip, respectively, and thereby the molten glass in the tube, at the necessary temperature for dripping. Suitable temperature ranges for the delivery tube and for its tip have been found to be between 1350° and 1500° C. and between 1300° and 1400° C., respectively. It will be understood that windings 8, 9 and 11 are connected to a suitable source of electrical current for heating thereof, however, for purposes of simplification of the drawing, such connections and source are not shown therein. The entire apparatus just described is supported above a table 45 by upright supports 42 and 43. Although the apparatus is described as supported above a table 45, it could, as is obvious, be supported above any type of platform or above the floor.

A drip pressing mold is shown in a drip receiving or catching position beneath the orifice 10 of delivery tube 3. Mold 6 is supported by a piston rod 20 extending into a cylinder 23 and provided on the end thereof opposite the mold, that is, on the end of the rod within cylinder 23, with a piston 25. Piston 25 is normally biased to a downward position within cylinder 23 by the pressure of a coil spring 27, and is actuated to an upward position against the pressure of the coil spring when air is supplied, in the manner hereinafter discussed, to cylinder 23 through a flexible conduit 39 connected to the cylinder. Mold 6 is also provided with a heater winding 26 to maintain the mold and, thereby, each drip of glass caught by the mold, at the correct temperature for forming. A suitable temperature range for the mold has been found to be between 600° and 700° C. For purposes of simplification, the electrical connections to winding 26 are also omitted from the drawing.

There is affixed by suitable means to cylinder 23 a piston rod 15 extending into another cylinder 13, such rod being provided on the end thereof opposite cylinder 23, that is, on the end of the rod within cylinder 13, with a piston 14. Piston rod 15 partially supports cylinder 23 and mold 6, and such cylinder and mold are moved from the drip catching position beneath the orifice 10 of tube 3 to a drip pressing position, to be discussed, and from such drip pressing position to the drip catching position, according as air is supplied to air conduits 38 and 37, respectively, shown connected to cylinder 13. The operation of cylinder 13 and its associated piston and piston rod, and cylinder 23 and mold 6, will be further discussed hereinafter in this description. Cylinder 23 in addition to being supported by piston rod 15 is also supported by a rod 19 affixed to the cylinder by suitable means and extending through a guide 18 mounted on upright support 43. Rod 19 and guide 18 are so constructed that the rod may slide freely in a horizontal plane through the guide when cylinder 23 is, as hereinafter discussed, moved between drip catching and drip pressing positions.

An additional upright support 54 is affixed to table 45 and an electrical switch 22 having an actuating member 21 is mounted thereon as shown. This actuating member may be in the form of a toggle or pushbutton, and switch 22 is so mounted on support 54 that the toggle or pushbutton 21 is aligned with rod 19 and is operated by the rod when cylinder 23 and therefore the rod are moved to the drip pressing position. Electrical switch 22 is of a type that is normally biased to an open circuit condition by spring or other suitable biasing means, and is operated to a circuit closing condition only when its actuating member 21 is operated, the switch returning to its normal open circuit condition when member 21 is no longer operated. Such electrical switches are well known, and no internal details thereof are shown in the drawing nor is any further discussion of its operation believed necessary. It should be pointed out, however, that switch 22 is connected over an electrical conductor 36 to terminal X of a suitable source of control current, and to an electrical conductor 53 which extends to the electrical control apparatus shown in FIG. 3 and to be described. In view of this discussion, it will be readily apparent that a circuit is completed from terminal X of said current source to conductor 53 only when the actuating member 21 of switch 22 is operated, that is, only when cylinder 23 is actuated to the drip pressing position and, therefore, rod 19 is moved through guide 18 to engage actuating member 21.

There is also attached to the top of upright support 54 a horizontal supporting member 55 near the end of which is affixed, by suitable means, a fixed mold plunger 24. Supporting member 55 and plunger 24 are so located in relation to cylinder 13, and in relation to cylinder 23 and mold 6, that the plunger will be situated directly above mold 6 when the mold and its actuating cylinder 23 are in the drip pressing position. Thus, when cylinder 23 and mold 6 are in such position, the actuation of piston 25 of cylinder 23 by the admission of air under pressure to such cylinder, in the manner hereinafter discussed, will cause mold 6 to move upward and press a drip of molten glass contained in the mold against fixed plunger 24. Similar to mold 6, plunger 24 is provided with a heater winding 12 to maintain the plunger at a temperature which will allow proper forming and cooling, and at the same time prevent too rapid cooling of the glass gob or drip contained in mold 6. A suitable temperature range for the plunger is from 150° to 250° C.

Below and to the rear of fixed plunger 24 there is shown another cylinder 28 provided with a piston rod 29. The forward end of rod 29 is provided with a wire brush 31 employed, as hereinafter discussed, for ejection of pressed glass disks 32 from the mold 6. A chute 33 is provided below and to the front of plunger 24 to receive the glass disks 32 ejected from the mold by brush 31. The chute 33 guides the pressed glass disks into a suitable receiving container 35. This apparatus will be further described in conjunction with the discussion of FIG. 2 hereinafter, since such apparatus is more clearly shown in that figure of the drawings.

Referring further to FIG. 1, a radiant energy responsive means shown as photo-responsive device 47 is mounted through means of a support 48 on table 45 in such a position that the device will respond to the luminosity of each of the falling drips 7 of molten glass, the detection of the luminosity of each drip being made by device 47 through an aperture 46 provided in a shield 44, as indicated by the dotted line 52. The radiant energy responsive means or photo-responsive device 47 is connected over an electrical conductor 49 to terminal X of the previously mentioned source of control current, and over electrical conductor 51 to the control apparatus shown in FIG. 3 of the drawings and to be discussed. A circuit extending from terminal X of the current source, over conductor 49 to the photo-responsive device 47 and thence to conductor 51, is closed whenever the device 47 responds to the luminosity of a drip of molten glass falling past aperture 46. The details of device 47 are not shown in the drawings since such devices and their operation are well known. The purpose of the apparatus just discussed will become apparent as the description proceeds.

It is believed expedient to point out at this time that some of the drips of molten glass are not caught for forming or pressing and, therefore, a catch pot 40 is provided beneath mold 6 and cylinder 23 to catch such drips. This will be further discussed later in the description.

Figure 2:
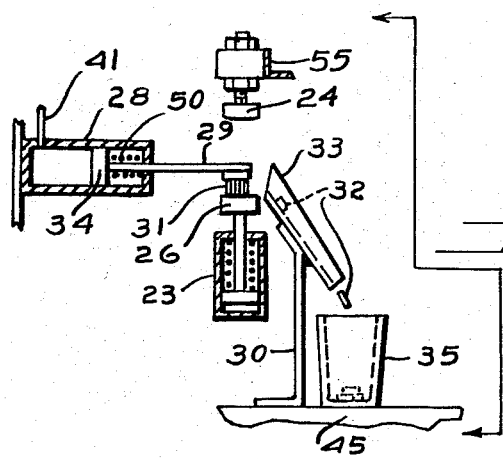
FIG. 2 is a fragmentary side view, partly in section, taken on the line 2—2 of FIG. 1 and showing certain parts of the apparatus which cannot be clearly illustrated in FIG. 1.

Referring to FIG. 2, a side view of the apparatus for ejecting the formed glass disks 32 from mold 6 is shown in its actuated position. The previously discussed cylinder 23 and mold 6 are in the position they occupy immediately following the pressing of a drip of glass, mold 6 having returned from its pressing position against plunger 24 mounted on support 55 to its downward position as shown, and air under pressure is then supplied, as hereinafter described, through a conduit 41 to cylinder 28. A piston 34 within cylinder 28, and attached to the opposite end of rod 29 from that to which wire brush 31 is attached, is actuated, by said supply of air, against the pressure of a coil spring biasing means 50 within cylinder 28, and rod 29 and brush 31 are moved to the position shown. Such movement of brush 31 ejects the pressed glass drip or disk 32 from the mold 6 into chute 33 which is mounted by an upright support 30 on table 45. The glass disk 32 slides down the chute 33 and drops into container 35. Thereafter, as hereinafter discussed, the supply of air through conduit 41 is terminated, and piston 34, rod 29 and brush 31 are returned to their normally retracted position by the pressure of the spring biasing means 50 on piston 34 within cylinder 28.

It is believed that the electrical control system employed with the apparatus of the invention and shown in FIG. 3 will best be described by giving several examples of such control system operating in conjunction with the apparatus shown in FIGS. 1 and 2. However, it should first be pointed out that the air conduits 37, 38, 39 and 41 shown in the upper righthand corner of FIG. 3 correspond to conduits 37, 38, 39 and 41, respectively, shown in FIGS. 1 and 2. Similarly, electrical conductors 51 and 53 shown in the upper left-hand part of FIG. 3 correspond to conductors 51 and 53, respectively, shown in FIG. 1.

The apparatus is shown in FIG. 1 in the condition it occupies or assumes when air under pressure is first supplied to the apparatus, and before the drips of glass start forming and falling. This is considered the normal condition of the apparatus and at such time a magnetically actuated air valve V3 (FIG. 3) is energized by a circuit extending from terminal X of the previously mentioned suitable current source over contacts 76–79 of a relay R3 (FIG. 3) in the released (deenergized) condition of the relay, and thence through the control winding of magnetic valve V3 to terminal Y of said current source. Valve V3 is thereby actuated to admit air from the air line shown in FIG. 3 to conduit 37 and thence to cylinder 13 (FIG. 1) to actuate piston 14, rod 15, cylinder 23 and mold 6 to their positions shown in FIG. 1, so that mold 6 is in position to catch a drip of molten glass issuing from orifice 10 of tube 3. The apparatus now remains in the condition until the first drip of molten glass is detected by photo-responsive device 47.

When a drip of molten glass 7 falls past aperture 46 in shield 44 and actuates device 47, a circuit is completed which extends from terminal X of the current source, over conductor 49 to conductor 51 (FIG. 1) and thence through the control winding of a relay R1 (FIG. 3) to terminal Y of the current source. Relay R1 becomes momentarily picked up (energized) and closes a pickup circuit for a relay R2. This circuit extends from terminal X of the current source over contacts 88 and 89 of a relay R6 in its released condition and to be described, over contacts 72–73 of relay R1 and thence through the winding of relay R2 to terminal Y of the current source. Relay R2 becomes picked up and closes a holding circuit for itself including its own contacts 74–75 in a shunt circuit around contacts 72–73 of relay R1. Thus, when relay R1 is thereafter released (deenergized) and opens its contacts 72–73, due to the aforesaid drip of molten glass having passed aperture 46 (FIG. 1) and no longer being detected by device 47, relay R2 is maintained in its picked-up condition over said holding circuit.

Relay R2 becoming picked up closes an energizing circuit for a relay R3 which is provided with a means to delay the pickup of the relay for a selected period of time. This circuit extends from terminal X over contacts 104–105 of relay R2, over an adjustable resistor RE1 and thence through the control winding of relay R3 to terminal Y. A capacitor C1 is connected across the control winding of relay R3 and, in conjunction with resistor RE1, provides the aforesaid delay period of the pickup of the relay, such delay period being only of sufficiently long duration to insure that the previously mentioned drip of molten glass has been received by mold 6 before the mold is actuated to its pressing position in the manner hereinafter discussed, and of sufficiently short duration to insure that mold 6 is moved from the path of the falling drips before the drip next following the caught drip falls. Capacitor C1 and resistor RE1 are so selected in conjunction with the winding of relay R3 and the source of control current that the desired delay time can be obtained through manual adjustment and setting of adjustable resistor RE1. Such delay circuits are well known in the electrical art and no further detailed discussion thereof is believed necessary.

Following the delay period of the pickup of relay R3, discussed above, that relay becomes picked up, opens the previously traced circuit over contacts 76–79 of the relay to the control winding of magnetic valve V3, and closes, over contacts 76–77 of the relay, an obvious energizing circuit for the control winding of a magnetically actuated valve V2 which controls the supply of air to conduit 38. Such operation terminates the supply of air under pressure to conduit 37 and admits a supply of such air to conduit 38.

The termination of the supply of air to conduit 37 and the supply of air to conduit 38 actuates piston 14 in cylinder 13 (FIG. 1) to its opposite position than that shown in FIG. 1 and piston rod 15 moves cylinder 23 and, thereby, mold 6 to the drip pressing position beneath fixed plunger 24. Such movement of cylinder 23 causes rod 19, affixed to the cylinder, to slide through its guide 18 and operate actuating member 21 of electrical switch 22 to the circuit closing condition of the switch. A circuit is then completed through the switch, such circuit extending from terminal X of the current source, over conductor 36, switch 22, conductor 53 (all FIG. 1) and thence to contacts 90–91 of previously mentioned relay R6 (FIG. 3) to be discussed, contacts 80–81 of relay R3 and over an adjustable resistor RE2, and through the control winding of a relay R4 to terminal Y of the current source. A capacitor C2 is connected across the control winding of relay R4 and, in conjunction with resistor RE2, provides a means for delaying the pickup of relay R4, such means being similar to that described for relay R3 and, therefore, no further discussion thereof being considered necessary. It should be pointed out, however, that resistor RE2 is manually adjusted to provide a delay time for the pickup of relay R4 of a duration sufficient only to insure that cylinder 23 and mold 6 have come to rest in the drip pressing position before the pressing operation described below is initated.

When relay R4 (FIG. 3) becomes picked up following its delay period, it closes an energizing circuit for a timing device shown as a relay T1 and, at the same time, an energizing circuit for a magnetically actuated air valve V4 which controls the compressed air supply to conduit 39 leading to cylinder 23 of the apparatus of FIGS. 1 and 2. This first circuit extends from terminal X over contacts 82–83 of relay R4 and thence through the control winding of timing relay T1 to terminal Y of the current source. The second circuit extends from terminal X over said contacts 82–83 of relay R4, contacts 94–97 of timing relay T1 and thence through the control winding of valve V4 to terminal Y of the current source. Timing device or relay T1 may be any one of a number of types of such relays, well known in the electrical art, which actuates its contacts from a first position to a second position only following a preselected time period after the energization of the winding of the relay, but which actuates such contacts from said second position to the first position immediately upon the deenergization of the relay winding. Thus, the above traced circuit over contacts 94–97 of relay T1 is interrupted only following a predetermined time period, such time period being occasioned by the delay time of the pickup of relay T1 and the resulting actuation of its contacts from said first position to said second position. Valve V4 is, therefore, energized over the above traced circuit for the period of time chosen for the time delay period of timing relay T1, such delay period being selected in accordance with the duration of the chosen time period for pressing the glass drips.

When valve V4 is energized as discussed above and admits air from the air line to conduit 39, piston 25 of cylinder 23 (FIG. 1) is actuated upward against the pressure of spring 27, thereby moving rod 20 and mold 6 in an upward direction and pressing the drip of glass in mold 6 between the mold and fixed plunger 24. As discussed above, such pressing of the glass drip continues for the chosen period of time provided by timing device or relay T1.

Upon the termination of the period for pressing the glass drip, relay T1 actuates its contact 94 to interrupt the previously traced circuit over contacts 94–97 of the relay and to complete a circuit over contacts 94–95 of the relay. The interruption of the circuit over said contacts 94–97 deenergizes the control winding of magnetic valve V4 and the air supply to conduit 39 is terminated. The interruption of such air supply allows spring 27 in cylinder 23 (FIG. 1) to move piston 25, rod 20 and mold 6 to their normal downward positions, and the drip pressing period is terminated.

The above-mentioned transfer of contact 94 of relay T1 and the completion of the circuit over contacts 94–95 of the relay, closes an energizing circuit for a relay R5. This circuit extends from terminal X of the current source over contacts 82–83 of relay R4, contacts 94–95 of relay T1, over an adjustable resistor RE3 and through the control winding of relay R5 to terminal Y of the current source. A capacitor C3 is connected across the control winding of relay R5 and, along with resistor RE3, provides a delayed pickup time for relay R5 similar to that previously discussed for relays R3 and R4. This delay time is set by the adjustment of resistor RE3 so as to be of sufficient duration to insure the return of mold 6 (FIG. 1) to its downward position and permit any necessary cooling of the formed glass disk before the ejection of such disk from mold 6, as described below, occurs.

When relay R5 becomes picked up following its time delay, an energizing circuit for a second timing device or relay T2 is completed along with an energizing circuit for the winding of a magnetically actuated valve V1 controlling the admission of air to conduit 41, which in turn supplies air to ejection cylinder 28 (FIGS. 1 and 2). The first of these circuits extends from terminal X of the current source over contacts 84–85 of relay R5 and thence through the control winding of timing device or relay T2 to terminal Y of the current source. The second circuit mentioned extends from terminal X over said contacts 84–85 of relay R5, contacts 98–101 of timing relay T2 and thence through the control winding of valve V1 to terminal Y of the current source. Timing device or relay T2 operates in a manner similar to that described for timing relay T1, and the time delay period chosen for relay T2 is of only sufficient duration to insure that the ejection step described below has time to be completed.

When, as discussed above, the control winding of valve V1 is energized and air is admitted to conduit 41 and, thereby, to cylinder 28, piston 34 (FIG. 2) is moved against the biasing pressure of spring 50, and rod 29 and brush 31 are actuated so that the brush wipes against the bottom of mold 6 and ejects the glass disk 32 therefrom as previously discussed. The condition of the ejection apparatus at this time is believed clearly shown in FIG. 2.

Following the expiration of the time delay period of timing relay T2, the relay interrupts, at its contacts 98–101, the energizing circuit to the control winding of valve V1 and closes a circuit over contacts 98–99 of the relay. The interruption of said energizing circuit terminates the supply of air to conduit 41 and thence to cylinder 28, and the ejection apparatus returns to normal as previously discussed. The closing of the circuit over contacts 98–99 of timing relay T2 prepares an energizing circuit for the previously mentioned relay R6. This circuit may be traced from terminal X of the current source over contacts 84–85 of relay R5, contacts 98–99 of timing relay T2, contacts 102–103 of relay R3, and over contacts 70–71 of relay R1 through the control winding of relay R6 to terminal Y of the current source. This circuit is prepared but it is not necessarily completed at this time since it is probably open at contacts 70–71 of relay R1. However, upon the detection thereafter of the next falling drip of molten glass by the photo-responsive device 47 (FIG. 1) relay R1 becomes energized, as previously discussed, and the circuit over contacts 70–71 of relay R1 to the winding of relay R6 is completed. This circuit could, of course, have been immediately completed at the time of closure of contacts 98–99 of timing relay T2, if contacts 70–71 of relay R1 had also been closed at such time due to the detection of a falling drip of molten glass by photo-responsive means 47. In any event, relay R6 becomes picked up upon the detection of a falling glass drip detected at the same time or after the closure of contacts 98–99 of timing relay T2. Relay R6 is provided with a holding circuit which includes its own contacts 86–87 in shunt around contacts 70–71 of relay R1 and, therefore, once becoming picked up through the closure of contacts 70–71 of relay R1 as discussed above, relay R6 is maintained picked up until its control circuit is thereafter interrupted as discussed below.

Relay R6 becoming picked up as discussed above, initiates two series of cascading actions. First, relay R2 becomes released due to its pickup circuit being interrupted at contacts 88–89 of relay R6. This, in turn, interrupts at its contacts 104–105 the energizing circuit for relay R3. The consequential release of relay R3 interrupts at contacts 76–77 of that relay the energizing circuit for the control winding of magnetic valve V2, and closes at contacts 76–79 of relay R3 the energizing circuit for the control winding of magnetic valve V3. The deenergization and energization of valves V2 and V3, respectively, interrupts the supply of compressed air to conduit 38 and admits air to conduit 37, respectively, and piston 14, rods 15 and 19, cylinder 23 and mold 6 (all FIG. 1) are actuated to the normal drip catching position shown in FIG. 1. The cascading action just described provides a time delay of only sufficiently long duration to insure that the drip of molten glass, which caused the energization of relay R6, has cleared the path of movement of cylinder 23 and mold 6 to the drip catching position prior to such movement, and of sufficiently short duration to insure that said cylinder and mold again occupy the drip catching position prior to the fall of the molten glass drip next following the drip which caused the energization of relay R6. In this manner the movement of mold 6 to its drip catching position, without collision with and consequential splattering of any of the drips of molten glass, is assured.

The second of the series of cascading actions mentioned above occurs due to the interruption, at contacts 90–91 of relay R6, of the energizing circuit for relay R4 which consequently releases. The release of relay R4 interrupts at contacts 82–83 of that relay the energizing circuit for timing relay T1 which in turn releases and interrupts at its contacts 94–95 the energizing circuit for relay R5, which also releases. The release of relay R5 interrupts at contacts 84–85 of that relay the energizing circuit for timing relay T2 which is then released. The release of timing relay T2 interrupts at contacts 98–99 of that relay the energizing circuit for relay R6 which then also releases. The release of relay R6 again closes contacts 90–91 in the energizing circuit for relay R4 but, at such time, that energizing circuit is open at contacts 80–81 of relay R3. This circuit has also become interrupted due to rod 19 no longer being in an actuated position against actuating member 21 of switch 22 (FIG. 1) and switch 22, being, therefore, in its normal open circuit condition. Thus, with the release of relay R6 as discussed above, all of the apparatus has returned to its normal condition, a cycle of drip catching and pressing has been completed, and another cycle of catching and pressing another drip of molten glass may then begin.

It will be noted that during the period of time between the catching and pressing of a drip of molten glass and the return of the mold to its drip receiving position, one or more drips of glass (depending on the drip rate and, therefore, the viscosity of the molten glass) will fall into the catch pot 40. However, it is obvious that, within the scope of the present invention, additional molds could be provided and arranged to catch and press every falling glass drip.

As previously mentioned, the liquidus temperatures of the glass-making compositions with which it is intended that the apparatus of the invention be used are in the range of from 1250° to 1400° C. By maintaining the tip of the delivery tube 3 within a temperature range of from 1300° to 1400° C. as previously mentioned, each glass gob or mold charge issuing from the orifice 10 of delivery tube 3 is within a temperature range of from 1250° to 1400° C. at the instant of hitting mold 6 and is at a temperature within a temperature range of from 1200° to 1300° C. just prior to the pressing of the glass gob or mold charge by the plunger 24. As also previously mentioned, suitable temperature ranges for mold 6 and plunger 24 are between 600° and 700° C., respectively, and it has been found that, by maintaining the different parts of the apparatus within the temperature ranges stated, the formed glass wafers or disks are ejected from the mold at a temperature within a range of from 750° to 900° C., that is, well below the liquidus temperatures of the glass-making compositions from which the wafers are formed.

Since the rate at which the apparatus of the invention operates depends substantially on the settings of the previously discussed timing circuits, such settings depending in turn partly on the specific molten glass-making composition being used to form a series of wafers, it will be readily apparent that the periods of time in which the gobs of various molten glass-making batches are cooled from their liquidus temperatures to their temperatures at ejection as wafers varies in accordance with said settings. These periods of time may vary from approximately 2 seconds to approximately 6 seconds but the cooling of the glasses from their liquidus temperatures (range of 1250° to 1400° C.) to the ejection temperatures of the glass wafers (range of 750° to 900° C.) within the time range of from 2 seconds to 6 seconds provides a sufficiently rapid cooling rate which is well within tolerable limits for the desired uniform forming of the glass wafers.

Although there is herein shown and described only a single form of apparatus and control system embodying the invention, it is to be understood that variations of the invention may be made within the scope and spirit of the appended claims.

What is claimed is:

1. The method of forming wafers or disks from a molten glass-making material having a liquidus temperature in the range of from 1250° to 1400° C. which includes dripping self-forming drips of the molten material from the orifice of a tube maintained at a temperature in the range of from 1300° to 1400° C., catching single drips of the molten material, and simultaneously pressing and cooling each caught drip to a temperature within the range of from 750° to 900° C. within a time period of from 2 to 6 seconds subsequent to the moment such caught drip leaves said tube.

2. A method according to claim 1 wherein the glass-making material is a melt of glass having an extremely low viscosity at its liquidus temperature and a strong tendency toward rapid devitrification during cooling.

3. The method of forming wafers or disks from a molten glass-making composition having a low viscosity at its liquidus temperature which includes dripping self-forming drips of the molten glass from an orifice maintained at a temperature at or above the liquidus temperature of the glass, periodically catching single drips of the molten glass, and pressing and simultaneously cooling each caught drip to a maximum temperature of 900° C. within a maximum time period of 6 seconds.

4. A method according to claim 3 wherein the molten glass-making composition is a melt of glass having a strong tendency toward rapid devitrification when cooled below its liquidus temperature.

5. The method of forming disks or wafers of a glass-making material which includes heating the material to a selected temperature range above the melting point of the material, issuing the molten material from an orifice having a diameter so selected in accordance with the viscosity of the material when within said temperature range that the material drips from the orifice in self-forming drips, and catching and pressing single drips of the molten material.

6. The method of charging a glass-forming mold with a charge of molten glass having an extremely low viscosity which includes issuing the molten glass from an orifice having a diameter selected in accordance with the viscosity of the molten glass so that the glass issues from the orifice in freely forming and falling drops, and catching in said mold a predetermined number only of said drops.

References Cited by the Examiner

UNITED STATES PATENTS

| | | | |
|---|---|---|---|
| 1,941,552 | 1/1934 | Henry et al. | 65—164 |
| 2,010,777 | 8/1935 | Grotta | 65—164 |
| 2,132,390 | 10/1938 | Blau | 65—33 |
| 2,339,975 | 1/1944 | Blau. | |
| 2,433,013 | 12/1947 | Ziegler | 65—147 |
| 2,669,806 | 2/1954 | Van De Walla et al. | 65—223 |
| 2,950,571 | 8/1960 | Wythe | 65—164 |
| 2,960,801 | 11/1960 | King et al. | 65—33 |
| 2,960,802 | 11/1960 | Voss | 65—33 |
| 3,113,009 | 12/1963 | Brown et al. | 65—33 |
| 3,113,877 | 12/1963 | Janakirama-Rao. | |

DONALL H. SYLVESTER, *Primary Examiner.*

F. W. MIGA, *Assistant Examiner.*